US006850887B2

(12) United States Patent
Epstein et al.

(10) Patent No.: US 6,850,887 B2
(45) Date of Patent: Feb. 1, 2005

(54) SPEECH RECOGNITION IN NOISY ENVIRONMENTS

(75) Inventors: Edward Epstein, Putnam Valley, NY (US); Burn Lewis, Ossining, NY (US); Etienne Marcheret, Mt. Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 726 days.

(21) Appl. No.: 09/796,322

(22) Filed: Feb. 28, 2001

(65) Prior Publication Data

US 2002/0120443 A1 Aug. 29, 2002

(51) Int. Cl.[7] .............................................. G10L 15/00
(52) U.S. Cl. ..................................... 704/252; 704/255
(58) Field of Search ................................ 704/231, 243, 704/251, 252, 255, 219, 220, 264, 262

(56) References Cited

U.S. PATENT DOCUMENTS 5,956,675 A * 9/1999 Setlur et al. ................. 704/231
6,405,168 B1 * 6/2002 Bayya et al. ................ 704/256
6,577,997 B1 * 6/2003 Gong ........................ 704/252
6,711,536 B2 * 3/2004 Rees ......................... 704/210

OTHER PUBLICATIONS

Philips Corporation, "Noise Suppression", http://www.research.philips.com/password/pw4/pw4_10b.html.
Thomas Kemp, et al., "Estimating Confidence Using Word Lattices", Proceedings of Eurospeech, Rhodes, Sep. 1997, pp. 827–830.
Frederick Jelinek, "Statistical Methods for Speech Recognition", MIT Press, 1997.
Lawrence Rabiner et al., "Fundamentals of Speech Recognition", Prentice Hall 1993.
Alejandro Acero, "Accoustical and Environmental Robustness in Automatic Speech Recognition", PhD Thesis, Carnegie Mellon University, 1990.

* cited by examiner

Primary Examiner—Susan McFadden
(74) Attorney, Agent, or Firm—Ference & Associates

(57) ABSTRACT

Methods and apparatus for providing speech recognition in noisy environments. An energy level associated with audio input is ascertained, and a decision is rendered on whether to accept the at least one word as valid speech input, based on the ascertained energy level.

13 Claims, 2 Drawing Sheets

SPEECH RECOGNITION IN NOISY ENVIRONMENTS

FIELD OF THE INVENTION

The present invention relates generally to speech recognition and, more particularly, to its employment in environments with ambient noise that has the potential to disrupt speech recognition.

BACKGROUND OF THE INVENTION

Generally, speech recognition systems are highly sensitive to background noise. Such noise can include background speakers, keyboard strikes and ringing phones, as well as breathiness from the actual speaker. Without the use of a close-talking microphone (i.e., a headset or handheld microphone, wherein the microphone is placed close to the mouth) the problem may become unmanageable, and even when a close-talking microphone is used, problems are still possible.

Conventional efforts have tended to lie on two fronts, namely, microphone design and speech recognition confidence scoring. For instance, "beamforming" microphones for hands-free systems have been designed to separate desired speech from interference based on direction of acoustic arrival. Here, signals arriving from directions or areas other than the "main beam", or the area of from which the voice originates, are suppressed. IBM has such a product, for providing hands free desktop array microphone input to the ViaVoice speech recognizer (Millennium Pro Elite). The Philips corporation also has similar products (see [http://]www.research.philips.com/password/pw4/pw4_10b.html).

Much work has also been done on speech recognition confidence scoring, including the publication "Estimating Confidence Using Word Lattices", Proceedings of Eurospeech, Rhodes, September 1997, pp. 827–830. Such approaches, however, do not take into account the strength of the audio signal.

What we are trying to do here is merge the two ideas, thus requiring communication between what the signal processor is seeing and what the acoustic models are trying to do with the signal. Problems have oft been encountered in connection with the conventional efforts described above. For instance, among the limitations of array microphone design is the sensitivity of any corresponding acoustic models that are used, since even very low energy signals often exhibit a strong acoustic model match. Thus, though robust acoustic models are certainly desirable for low recognition error, it is often the case that acoustic models, when presented with low energy signals (e.g., as the result of imperfect suppression by the beamform array or close talking microphone), will produce nonsensical words. The acoustic models also tend to model "disfluencies" which can swallow noises such as lip smacks, breath, or other non-speech events. Low-level background speech and constant frequency hums from machinery such as air conditioners does not fall under the disfluency category. Thus, these types of noises will also tend to produce nonsensical words.

Accordingly, in view of the foregoing, a need has been recognized in connection with improving the performance of speech recognition in noisy environments.

SUMMARY OF THE INVENTION

In accordance with at least one presently preferred embodiment of the present invention, a relationship may be employed between the goodness of fit between the speech model (detailed match score, or "DM") and input audio, and the audio energy (normalized C0 cepstral component) present at the microphone input to decide whether or not valid input speech is present at the microphone input. Decisions are preferably made on groups of decoded words or phrases (phrases are groups of words delimited by silence). Decisions on phrases preferably take precedence over groups of decoded words (or "firmed up" words). Thus, if a phrase boundary is encountered, a decision is preferably made on the previous group of decoded words.

Among the advantages of the present invention, in accordance with at least one embodiment, are extensive reduction in the decoding of input noise as words. This provides more reliable speech recognition in noisy environments and permits the use of less restrictive microphone setups, such as array microphones, for audio input to speech recognition systems.

In one aspect, the present invention provides a method of providing speech recognition in noisy environments, the method comprising the steps of: accepting audio input; determining at least one word associated with the audio input; ascertaining an energy level associated with the audio input; and rendering a decision on whether to accept the at least one word as valid speech input, based on the ascertained energy level.

In another aspect, the present invention provides an apparatus for providing speech recognition in noisy environments, the apparatus comprising: an input medium which accepts audio input; an arrangement which determines at least one word associated with the audio input; an arrangement which ascertains an energy level associated with the audio input; and a decision arrangement which renders a decision on whether to accept the at least one word as valid speech input, based on the ascertained energy level.

Furthermore, in an additional aspect, the present invention provides a program storage device readable by machine, tangibly embodying a program of instructions executable by the machine to perform method steps for providing speech recognition in noisy environments, the method comprising the steps of: accepting audio input; determining at least one word associated with the audio input; ascertaining an energy level associated with the audio input; and rendering a decision on whether to accept the at least one word as valid speech input, based on the ascertained energy level.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Throughout the present disclosure, various terms and concepts related to speech recognition are utilized that are generally well-known to those of ordinary skill in the art. For a more in-depth definition of "fast match", "detailed match" and other concepts related to general speech recognition, see "Statistical Methods for Speech Recognition", Frederick Jelinek, MIT Press, 1997. For an in-depth discussion on speech signal processing, see "Fundamentals of Speech Recognition", Lawrence Rabiner and Biing-Hwang Juang, Prentice Hall 1993, or "Advanced Digital Signal Processing", Proakis, Rader, Ling and Nikias, Macmillan Publishing Company, 1992.

Figure 1:
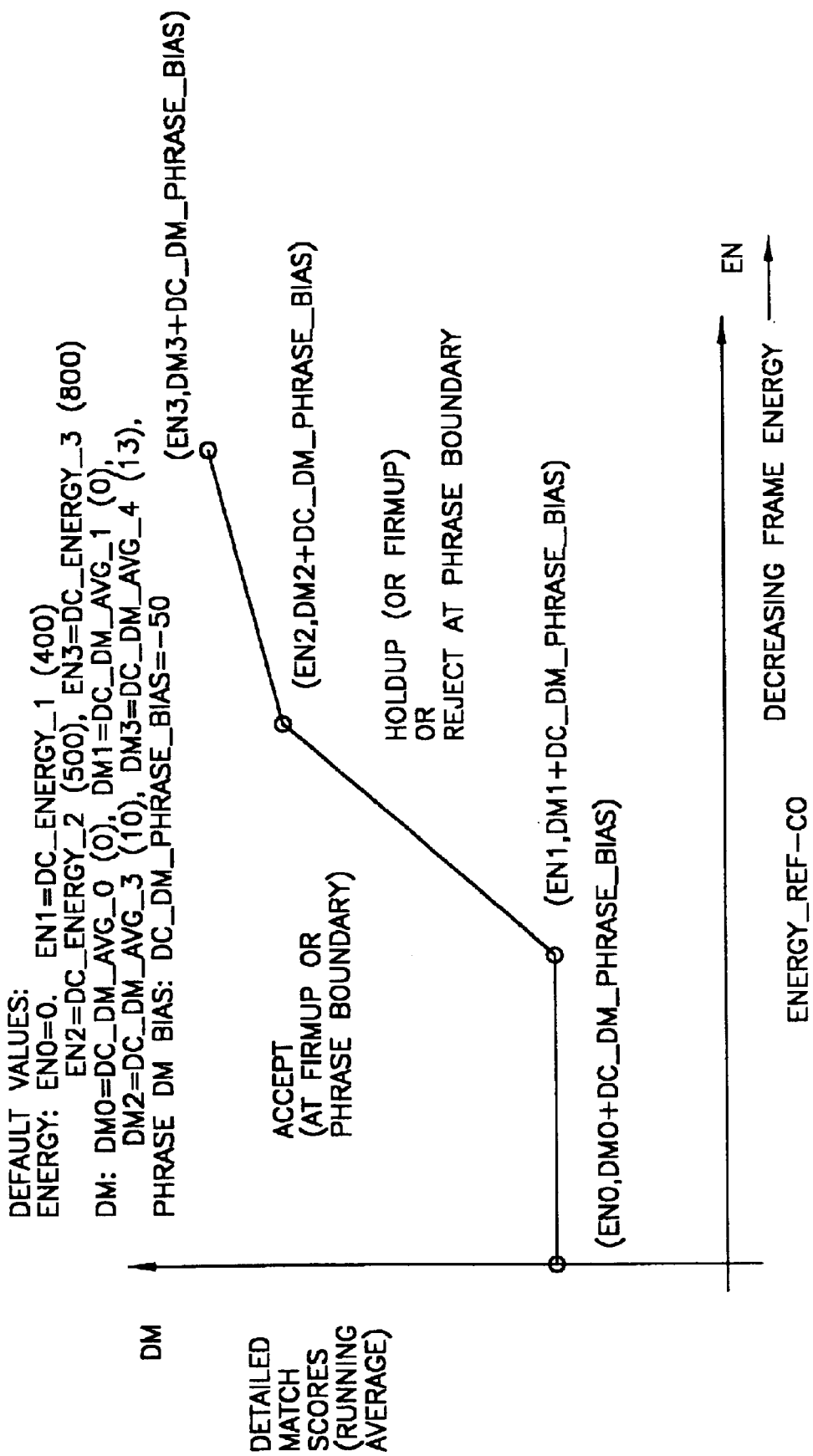
FIG. 1 illustrates a graph of an energy vs. DM relationship.

FIG. 1 illustrates a graph of an energy vs. DM relationship. The significance of this will be apparent from the discussion of FIG. 2 herebelow.

Figure 2:
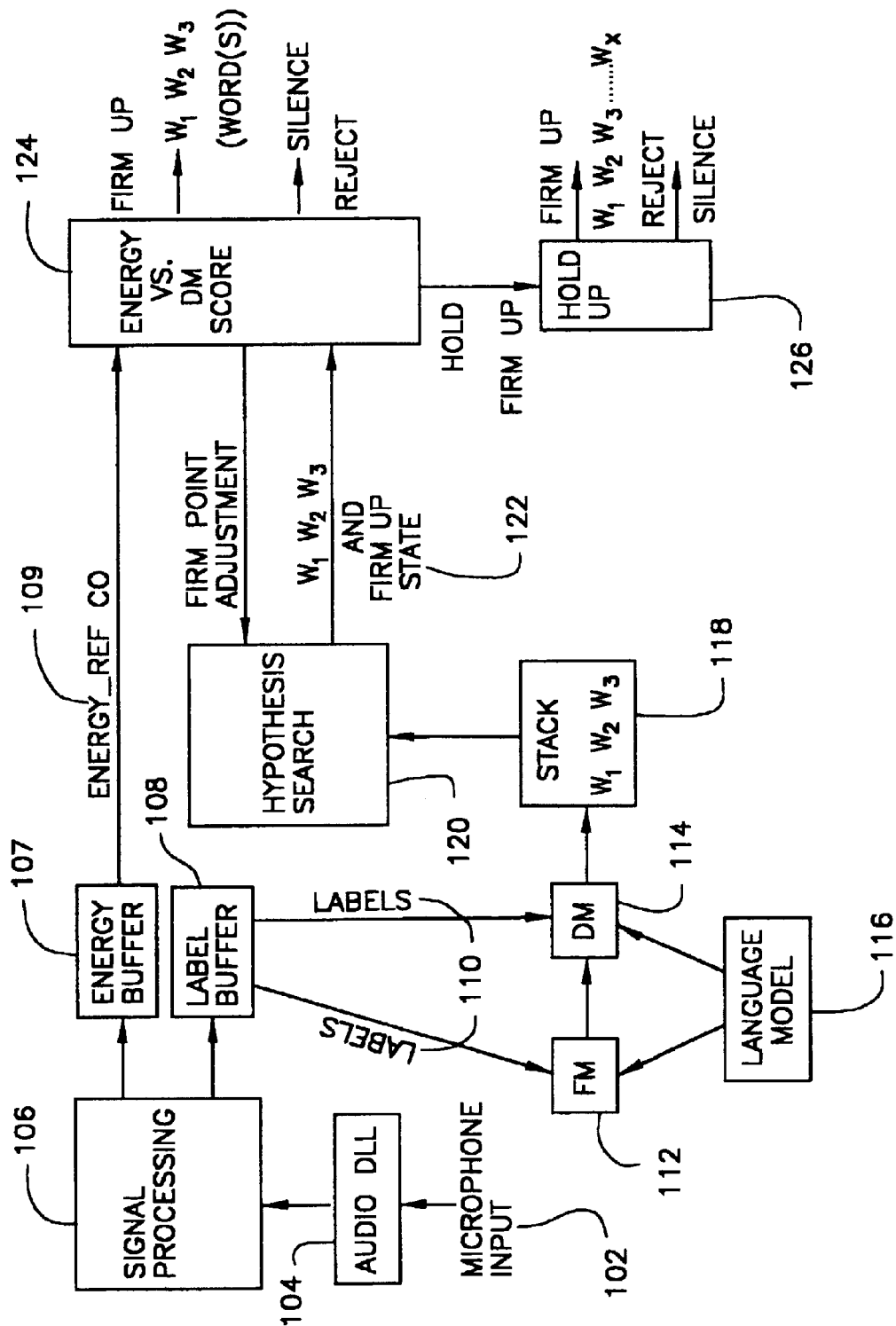
FIG. 2 schematically illustrates a speech recognition scheme.

FIG. 2 shows the manner in which the Energy vs. DM relationship is employed, in accordance with an embodiment of the present invention, in a speech recognition system. The Energy vs. DM relationship can be used in large vocabulary or grammar configurations, so that is essentially usable in any configuration, including desktop and telephony applications.

In accordance a preferred embodiment of the present invention, input audio 102 is windowed into (i.e., accepted in) blocks of duration, at audio DLL 104 where stationarity is assumed, usually on the order of 100 msec. "DLL" refers to "Dynamic Link Library", which is a piece of code written as a stand-alone "module" to be linked by a larger process. (In this case, a speech recognition engine is passed audio through an external interface, the audio DLL.) "Stationarity" is a condition in which the underlying probability density function governing the speech process is not changing for the short amount of time discussed, such that associated statistics will not change and, thus, the associated short segment of speech can be modeled. Also, "wide sense" stationarity is assumed here, speech process is not changing for the short amount of time discussed, such that associated statistics will not change and, thus, the associated short segment of speech can be modeled. Also, "wide sense" stationarity is assumed here, whereby the expected value of the process (mean or average) is constant, and the autocorrelation function depends only on the time lag (difference) between two shifted versions of the speech waveform.

In signal processing (106), an FFT cepstral vector (wherein "FFT" stands for Fast Fourier Transform, a method used to efficiently calculate the discrete Fourier Transform, a method used to extract the energy content of the waveform as a function of frequency) is preferably extracted from each block along with an energy term that may be called C0. This C0 term is the energy calculated from the frequency spectrum. The cepstral vector is mean normalized to account for channel and speaker variations. To this end, it should be noted that cepstral analysis is a form of "homomorphic deconvolution". For speech spectrum (from FFT calculation) $S(\omega)$, and channel response $H(\omega)$, a speech spectrum $\hat{S}(\omega)=S(\omega)H(\omega)$. results.

The cepstrum is calculated as the inverse log FFT, $$c(\tau)=F^{-1}\{Log(\hat{S}(\omega))\}=F^{-1}\{Log(S(\omega))\}+F^{-1}\{Log(H(\omega))\},$$

Long term averages of the cepstrum $C_{avg}=\Sigma c(\tau)$ attempt to capture the channel effects and effects of mismatch between speaker and acoustic models. In general, such effects are constant so that one would expect cepstral averages are continuously updated to account for slowly varying channels. More general discussions of methods to compensate for channel effects can be found in "Acoustical and Environmental Robustness in Automatic Speech Recognition", PhD Thesis, Alejandro Acero, Carnegie Mellon University, 1990.

The C0 term is preferably normalized by the energy reference ($\overline{C0}$=energy_ref−C0), where the energy reference is set to the maximum C0 found in the previous silence-delimited block of speech. The stability and reliability of this reference is a function of block duration, and of the robustness of silence detection. From the normalized cepstral vector, and $\overline{C0}$ a feature vector is calculated which is used by the acoustic model to determine the probability of this feature vector for all of the context dependent phonemes in the system. This result is placed in a label buffer 108 to be used by the speech decoder. A buffer similar in structure (energy buffer 107) contains $\overline{C0}$. For each frame of audio, a set of labels (110) and a single $\overline{C0}$ (109) is calculated in buffers 108 and 107, respectively.

The decoder preferably reads the labels 110 and, through a series of steps which include the fast match (FM) 112, detailed match (DM) 114 and application of language model 116, hypothesized words are placed in the stack 118. Each word placed in the stack 118 will contain its detailed match score, which is a measure of how well the word matched the associated sequence of labels. The detailed match will produce boundary times for the hypothesized word which can then be used for alignment in frame space. Because accurate time alignment of words is often difficult in continuous dictation systems, accurate estimates of word energies cannot be expected. To counter this sometimes crude alignment, one may preferably take as the estimate of the word energy the maximum 10 frame average energy. To enhance the reliability of this estimate, the 10 frame analysis block is preferably "slid" by 5 frames, forming a smoothed word energy contour. In other words, whereas the window of interest here is 10 frames (corresponding to 0.1 seconds of speech), the energy is preferably calculated based on this block of speech, then the analysis window is slid by 5 frames (0.05 seconds of speech) and the energy is recalculated. In so doing, the analysis window has been overlapped by 0.05 seconds, and the result is that a smoothed energy contour is produced.

The energies contributing to the aforementioned average are the normalized energies stored in the energy buffer. Because the energies are normalized with respect to a maximum energy reference and, for computational efficiency, there is preferably a "clamping" at zero. In other words, the normalized energy will preferably have a maximum value of zero. Thus, when it is zero, it equals the maximum energy reference. If it (the normalized energy) exceeds the maximum energy reference, then the maximum energy reference is preferably reset to this value and the resulting normalization for this frame is "clamped" to zero. Were this not done, the normalized energies may possibly take on negative values: $\overline{C0}$=energy_$ref-C0<0$ $if$ $C0>energy\_ref$.

Using the words in the stack, hypothesis search preferably takes place at step 120, wherein the upper bound word probabilities at each frame time are preferably used to form the upper portion of the envelope, while a fixed threshold below this upper envelope forms the lower portion of the envelope. A sequence of words forming incomplete paths in the stack either remain "alive" by falling within the envelope or are pruned out when falling below the envelope and remaining below this envelope for a specified time. A sequence of words are either naturally "firmed up" (that is, finalized such that the decoder renders a final decision), occurring when no other paths remain alive, or are forced to be firmed up when a previously specified amount of silence is encountered. The path ending with maximum probability is taken as the firm (or final) path in this case. The firm-up point within the stack is the point at which all paths ending at a time prior to or equal to are no longer considered as valid. All valid paths emanate from the firm-up point.

In accordance with at least one presently preferred embodiment of the present invention, the sequence of words to be firmed up (122) are then evaluated for acceptance, rejection, or hold up at step 124. The DM and energy for each word tagged for firm-up are sequentially compared to an Energy vs. DM curve such as that shown in FIG. 1, and the average Energy and average DM is computed for the entire sequence of words to be firmed up. If any words at the beginning of the sequence individually satisfy the Energy vs. DM relationship, which requires falling above the curve shown in FIG. 1, this word or words are accepted. Once a word is encountered that falls below the curve, then that word and the following words become candidates for rejection. The sequence of words to be evaluated in this manner can be in one of two states as previously described—either naturally firmed up or in a "forced" firm-up condition.

If a naturally firmed up state prevails, the average DM and average energy for the entire sequence, including those words that were accepted, is compared against the Energy vs. DM curve. If these averages do not satisfy the Energy vs. DM curve the sequence of words, excluding the accepted words, are tagged for possible rejection and put into a "holdup" condition (126). The accepted words at the beginning of the sequence cause the firm up point in the stack to move to the first held up word. On the next iteration of the decoder, since a holdup condition prevails, all new words to be firmed up are used to update the running DM and energy averages from the previous iteration. If a naturally firmed up state prevails again, the updated averages can cause a hold up state to remain or cause the entire held up path to be accepted if the updated averages result in the operating point moving above the Energy vs. DM curve. If the entire held up path is accepted, the firm up point is allowed to move forward and the entire process is reset. If a hold up condition remains, then the running DM and energy averages continue to be updated. If the firm up state switches to "forced" then based on the running DM and energy averages, the entire phrase is accepted or rejected.

It is to be understood that the present invention, in accordance with at least one presently preferred embodiment, includes an input medium which accepts audio input, an arrangement which determines at least one word associated with the audio input, an arrangement which ascertains an energy level associated with the audio input and a decision arrangement which renders a decision on whether to accept the at least one word as valid speech input, based on the ascertained energy level. Together, the input medium, determining arrangement, ascertaining arrangement and decision arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing speech recognition in noisy environments, said method comprising the steps of:
   accepting audio input;
   determining at least one word associated with the audio input;
   ascertaining an energy level associated with the audio input;
   normalizing the ascertained energy level;
   ascertaining a detailed match score associated with the at least one word; and
   rendering a decision on whether to accept the at least one word as valid speech input, based on the normalized energy level and match score.

2. The method according to claim 1, further comprising:
   providing a graph of detailed match score versus energy;
   said rendering step further comprising comparing the detailed match score to the graph.

3. The method according to claim 2, wherein said rendering step comprises accepting the at least one word as valid speech input if the detailed match score lies above the graph.

4. The method according to claim 2, further comprising determining whether the at least one word is in a natural firmed-up state.

5. The method according to claim 4, wherein rendering step comprises rejecting the at least one word as valid speech input if the detailed match score lies below the graph and the at least one word is determined as not being in a natural firmed-up state.

6. The method according to claim 4, wherein rendering step comprises holding the at least one word for further evaluation if the detailed match score lies below the graph and the at least one word is determined as being in a natural firmed-up state.

7. An apparatus for providing speech recognition in noisy environments, said apparatus comprising:
   an input medium which accepts audio input;
   an arrangement which determines at least one word associated with the audio input;
   an arrangement which ascertains an energy level associated with the audio input;
   an arrangement which norrmalizes the ascertained energy level;
   an arrangement which ascertains a detailed match score associated with the at least one word; and
   a decision arrangement which renders a decision on whether to accept the at least one word as valid speech input, based on the normalized energy level and match score.

8. The apparatus according to claim 7, further comprising:
   a graph of detailed match score versus energy;
   said decision arrangement being adapted to compare the detailed match score to the graph.

9. The apparatus according to claim 8, wherein said decision arrangement is adapted to accept the at least one word as valid speech input if the detailed match score lies above the graph.

10. The apparatus according to claim 8, further comprising an arrangement which determines whether the at least one word is in a natural firmed-up state.

11. The apparatus according to claim 10, wherein the decision arrangement is adapted to reject the at least one word as valid speech input if detailed match score lies below the graph and the at least one word is determined as not being in a natural firmed-up state.

12. The apparatus according to claim 10, wherein said decision arrangement is adapted to hold the at least one word for further evaluation if the detailed match score lies below the graph and the at least one word is determined as being in a natural firmed-up state.

13. A program storage device readable by machine, tangibly embodying a program of instructions executable by the machine to perform method steps for providing speech recognition in noisy environments, said method comprising the steps of:

accepting audio input;

determining at least one word associated with the audio input;

ascertaining an energy level associated with the audio input;

ascertaining an energy level associated with the audio input;

normalizing the ascertained energy level;

ascertaining a detailed match score associated with the at least one word; and rendering a decision on whether to accept the at least one word as valid speech input, based on the normalized energy level and match score.

\* \* \* \* \*